United States Patent
Kim et al.

(10) Patent No.: US 8,705,969 B2
(45) Date of Patent: Apr. 22, 2014

(54) OPTICAL BACKHAUL NETWORK FOR WIRELESS BROADBAND SERVICE

(75) Inventors: Byoung Whi Kim, Daejeon (KR); Han Hyub Lee, Daejeon (KR); Man Yong Park, Seoul (KR); Bong Tae Kim, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 523 days.

(21) Appl. No.: 13/000,459

(22) PCT Filed: Jul. 7, 2008

(86) PCT No.: PCT/KR2008/003993
§ 371 (c)(1),
(2), (4) Date: Dec. 21, 2010

(87) PCT Pub. No.: WO2009/157609
PCT Pub. Date: Dec. 30, 2009

(65) Prior Publication Data
US 2011/0188858 A1    Aug. 4, 2011

(30) Foreign Application Priority Data
Jun. 25, 2008    (KR) .................. 10-2008-0060356

(51) Int. Cl.
H04J 4/00    (2006.01)
(52) U.S. Cl.
USPC .................. 398/72; 398/71; 398/67
(58) Field of Classification Search
USPC .............. 398/72, 71, 70, 66, 67, 68
See application file for complete search history.

(56) References Cited

U.S. PATENT DOCUMENTS

| | | |
|---|---|---|
| 2004/0033076 A1 | 2/2004 | Song et al. |
| 2005/0100036 A1 | 5/2005 | Davis |
| 2006/0257149 A1 | 11/2006 | Hirth et al. |
| 2007/0280690 A1 | 12/2007 | Bouda et al. |
| 2008/0131125 A1* | 6/2008 | Byoung Whi et al. .......... 398/72 |

FOREIGN PATENT DOCUMENTS

| | | |
|---|---|---|
| KR | 2001-0113286 | 12/2001 |
| KR | 10-2005-0051116 | 6/2005 |

OTHER PUBLICATIONS

Korean Office Action 10-2008-0060356.
Korean Notice of Allowance 10-2008-0060356.
International Search Report for PCT/KR2008/003993, mailed Feb. 25, 2009.

* cited by examiner

Primary Examiner — M. R. Sedighian
(74) Attorney, Agent, or Firm — Staas & Halsey LLP (57) ABSTRACT

An optical backhaul network for a wireless broadband service is provided. The optical backhaul network for a wireless broadband service includes: a plurality of optical network units for outputting an uplink optical signal having a multiplexed wavelength; an optical line termination for outputting a downlink optical signal of a single mode in order to transmit the downlink optical signal to the plurality of the optical network units in a broadcasting form; and a plurality of remote nodes for outputting a part of the downlink optical signal to the plurality of the optical network units and for outputting the uplink optical signal to the optical line termination. Therefore, one center and a plurality of access points can be efficiently connected.

17 Claims, 7 Drawing Sheets

OPTICAL BACKHAUL NETWORK FOR WIRELESS BROADBAND SERVICE

CROSS REFERENCE TO RELATED APPLICATIONS

This application claims the benefit under 35 U.S.C. Section 371, of PCT International Application No. PCT/KR2008/003993, filed Jul. 7, 2008, which claimed priority to Korean Application No. 10-2008-0060356, filed Jun. 25, 2008, the disclosures of which are hereby incorporated by reference.

TECHNICAL FIELD

The present invention relates to an optical backhaul network for a wireless broadband service, and more particularly, to an optical backhaul network for a wireless broadband service that transmits a downlink optical signal of a single mode in order to transmit the downlink optical signal in a broadcasting form and that transmits an uplink optical signal having a multiplexed wavelength.

This work was supported by the IT R&D program of MIC/IITA[2007-S-014-01, Metro-Access Integrated Optical Network Technology].

BACKGROUND ART

As development of a wireless transmission technology, a transmission speed of wireless data has increased. Nowadays, a high-speed downlink packet access (HSDPA) service supports 2 Mbps and 14.4 Mbps at an uplink and a downlink, respectively, and wireless broadband (WiBro) supports 6 Mbps and 19.97 Mbps at an uplink and a downlink, respectively. Further, WiBro-evolution (WiBro-EVO) expected to appear in the near future is expected to support 50 Mbps at an uplink and a downlink, respectively.

In this way, as a data transmission amount to be processed by wireless terminals increases, it is necessary to develop a wire transmission network for transferring the data. As a characteristic of a wireless technology for supporting a large amount of wireless data, such as worldwide interoperability for microwave access (WiMAX) or WiBro, downlink data are transferred to a plurality of access points (AP) using a broadcasting method and are wirelessly transmitted to a subscriber terminal, however uplink data wirelessly transmitted from a plurality of subscriber terminals are primarily collected at a plurality of APs, and each of the APs transmits the corresponding data to the center using a wire.

Conventionally, the center and the AP were connected in a point-to-point form. However, when the APs are locally condensed, there is a problem that a point-to-point connection between the center and the APs uses many optical fibers.

DISCLOSURE

Technical Problem

The present invention has been made in view of the above problems, and provides an optical backhaul network based on wavelength division multiplexing (WDM) that efficiently connects one center and a plurality of APs by transmitting a downlink optical signal of a single mode in order to transmit the downlink optical signal in a broadcasting form and transmitting an uplink optical signal having a multiplexed wavelength.

Technical Solution

In accordance with an aspect of the present invention, an optical backhaul network for a wireless broadband service includes: a plurality of optical network units (ONUs) for outputting an uplink optical signal having a multiplexed wavelength; an optical line termination (OLT) for outputting a downlink optical signal of a single mode in order to transmit the downlink optical signal to the ONUs in a broadcasting form; and a plurality of remote nodes (RNs) for outputting a part of the downlink optical signal to the ONUs and for outputting the uplink optical signal to the OLT.

Advantageous Effects

In an optical backhaul network for a wireless broadband service according to an exemplary embodiment of the present invention, by transmitting a downlink optical signal of a single mode in order to transmit the downlink optical signal in a broadcasting form and transmitting an uplink optical signal having a multiplexed wavelength, in an optical backhaul network based on WDM, one center and a plurality of APs can be efficiently connected. Further, an optical fiber between the center and the APs can be reduced.

Further, because a wavelength of a single downlink optical signal and wavelengths of a plurality of uplink optical signals are fully apart, a low cost of band edge filter can be used.

BEST MODE

Exemplary embodiments according to the present invention are described with reference to the attached drawings.

Figure 1:
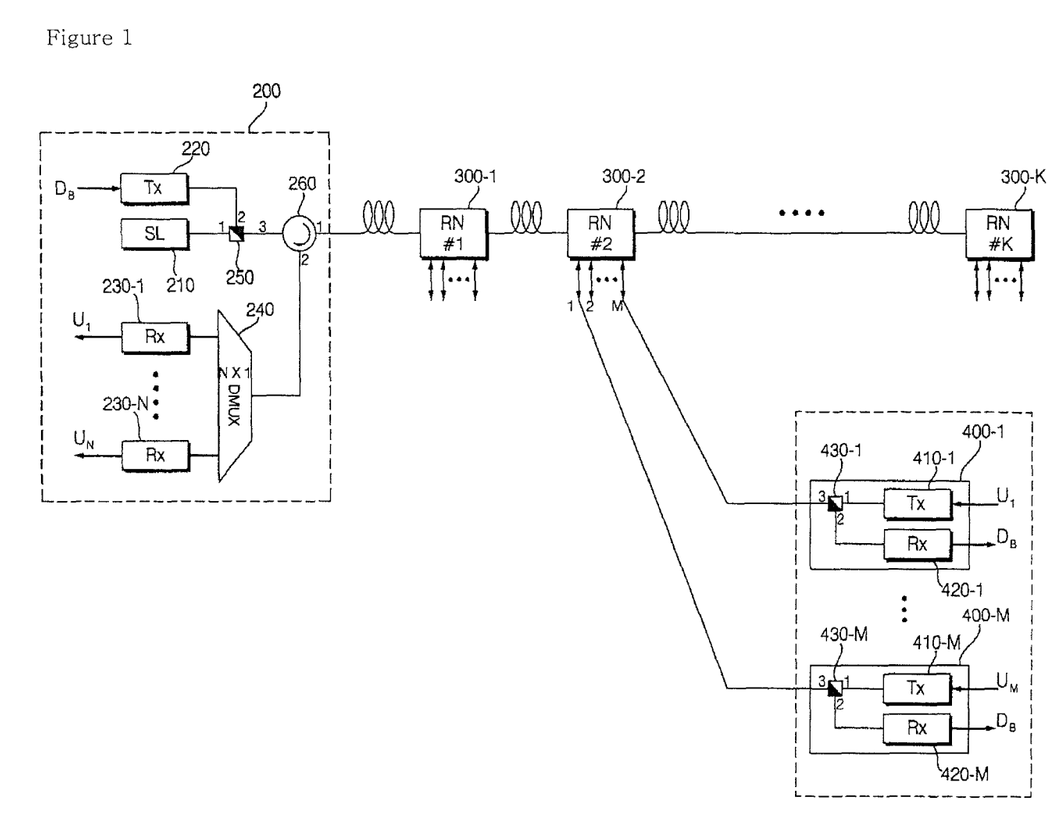
FIG. 1 is a diagram illustrating an optical backhaul network for a wireless broadband service according to an exemplary embodiment of the present invention.

FIG. 1 is a diagram illustrating an optical backhaul network for a wireless broadband service according to an exemplary embodiment of the present invention.

Referring to FIG. 1, an optical backhaul network of FIG. 1 includes one OLT 200, a plurality of remote nodes (RNs) 300-1 to 300-K, and a plurality of optical network units (ONUs) 400-1 to 400-M.

The OLT 200 outputs a downlink optical signal of a single mode in order to transmit a downlink optical signal in a broadcasting form to the ONUs 400-1 to 400-M.

Further, the OLT 200 receives an uplink optical signal having a multiplexed wavelength from the ONUs 400-1 to 400-M.

For this reason, the OLT 200 includes a seed light module (SL) 210, an optical transmitter (Tx) 220, a plurality of optical receivers (Rx) 230-1 to 230-N, an optical wavelength demultiplexer (DMUX) 240, an optical filter 250, and an optical circulator 260.

The SL 210 provides a seed light signal to the Txs 220 of the ONUs 410-1 to 410-M. The Tx 220 transmits a downlink optical signal of a single mode including downlink data. The plurality of Rxs 230-1 to 230-N receive an uplink optical signal. The optical wavelength DMUX 240 separates wavelengths of uplink optical signals having different wavelengths. The optical filter 250 couples a seed light signal and a downlink optical signal. The optical circulator 260 transfers downlink light including a seed light signal and a downlink optical signal to an external optical fiber and transfers an uplink optical signal coming up from the ONUs 400-1 to 400-M to the optical wavelength DMUX 240.

An operation of the OLT 200 is described in detail as follows.

Seed light having a multiplexed wavelength transmitted from the SL 210 is input to a port 1 of the optical filter 250 and is output to a port 3 thereof. A downlink optical signal of a single mode output from the Tx 220 is input to a port 2 of the optical filter 250 and is output to the port 3 thereof.

The downlink optical signal and downlink seed light are output from the port 3 of the optical filter 250, are input to a port 3 of the optical circulator 260, are output to a port 1 thereof, and are transmitted to an external optical fiber.

Uplink optical signals having a multiplexed wavelength coming up from the ONUs 400-1 to 400-M are input to the port 1 of the optical circulator 260, are output to a port 2 thereof, and are input to the optical wavelength DMUX 240.

Wavelengths of uplink optical signals input to the optical wavelength DMUX 240 are separated, and the wavelengths are input to the corresponding Rxs 230-1 to 230-N, respectively. In the Rxs 230-1 to 230-N, the wavelengths are converted to an electrical signal and are restored to uplink data.

Each of a plurality of RNs 300-1 to 300-K divides optical power of a part of a downlink optical signal of a single mode from the OLT 200, and outputs the same downlink optical signal to the ONUs 400-1 to 400-M.

Further, each of the RNs 300-1 to 300-K transfers another part of a downlink optical signal of a single mode to a next RN.

Each of a plurality of RNs 300-1 to 300-K transfers uplink optical signals coming up from the ONUs 400-1 to 400-M to the OLT 200.

An RN is described in detail with reference to FIGS. 6 and 7.

The ONUs 400-1 to 400-M receive a downlink optical signal of a single mode and a seed light signal having a multiplexed wavelength, and generate and output uplink optical signals of different wavelengths using the received seed light signal. For example, the uplink optical signal may be output to a wavelength division multiplexing packet.

For this reason, each of the ONUs 400-1 to 400-M includes Txs 410-1 to 410-M, Rxs 420-1 to 420-M, and an optical filters 430-1 to 430-M.

The Tx 410 transmits a generated uplink optical signal using a seed light signal. The Tx 410 may include a reflective semiconductor optical amplifier (RSOA). That is, the input seed light signal may be converted to similar continuous wave (CW) light, and the converted light may be modulated to uplink data and transmitted as an uplink optical signal.

The Rx 420 receives a downlink optical signal and restores downlink information, and the optical filter 430 transfers the downlink optical signal to the Rx 420 and transfers the uplink optical signal output from the Tx 410 to the RN 300.

An operation of the ONU 400 is described in detail as follows.

A downlink optical signal coming down from the RN 300 is input to a port 3 of the optical filter 430, is output to a port 2 thereof, and is input to the Rx 420. The downlink optical signal input to the Rx 420 is converted to an electrical signal and is restored to downlink data.

Downlink seed light coming down from the RN 300 is input to the port 3 of the optical filter 430, is output to a port 1 thereof, and is input to the Tx 410. A seed light signal input to the Tx 410 is amplified within the Tx 410 and is modulated by uplink data. Thereby, an uplink optical signal having a multiplexed wavelength is generated, and the uplink optical signal is transmitted from the Tx 410.

The uplink optical signal transmitted from the Tx 410 is input to the port 1 of the optical filter 430, is output to the port 3 thereof, and is transmitted to the RN 300.

The RN 300 and the ONU 400 can be connected using one optical fiber. The downlink seed light signal, the downlink optical signal of a single mode, the uplink optical signal having a multiplexed wavelength are transmitted through one optical fiber.

Because the downlink optical signal and the uplink optical signal use different optical wavelength signals, the downlink optical signal and the uplink optical signal can be transmitted through one optical fiber. Thereby, a configuration of an optical backhaul network for a wireless broadband service for efficiently connecting one center and a plurality of APs can be formed. Further, optical fiber between the center and the APs can be reduced.

Figure 2:
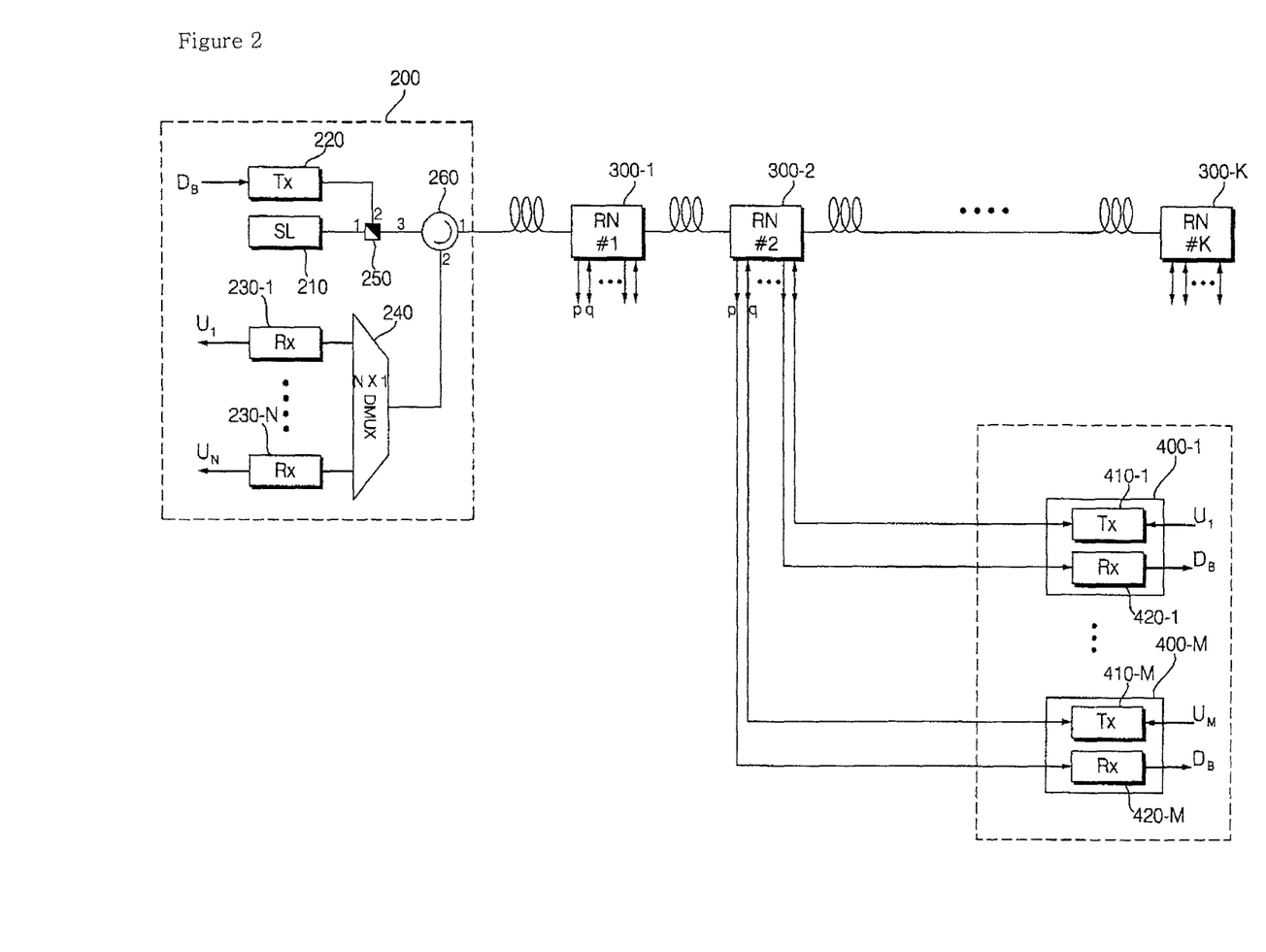
FIG. 2 is a diagram illustrating an optical backhaul network for a wireless broadband service according to another exemplary embodiment of the present invention.

FIG. 2 is a diagram illustrating an optical backhaul network for a wireless broadband service according to another exemplary embodiment of the present invention.

Referring to FIG. 2, an optical backhaul network of FIG. 2 is almost the same as that of FIG. 1. However, in the optical backhaul network of FIG. 2, the RN 300 and the ONU 400 are connected by two optical fibers, not one optical fiber of FIG. 1.

Accordingly, a downlink optical signal transmitted from the RN 300 to the ONU 400 is output from a port p of the RN 300, is input to an optical receiver 420 of the ONU 400, and is converted to an electrical signal.

Downlink seed light transmitted from the RN 300 to the ONU 400 is output from a port q of the RN 300, is input to the Tx 410 of the ONU 400, is amplified, is modulated by uplink data, and is again output toward the RN 300 as an uplink optical signal.

The Tx 410 may include an RSOA. That is, the input seed light signal may be converted to similar continuous wave light, and the converted light may be modulated to uplink data and be transmitted as an uplink optical signal.

In this way, as the downlink optical signal, the seed light signal, and the uplink optical signal are transmitted through different optical fibers, a configuration of an optical backhaul network for a wireless broadband service for efficiently connecting one center and a plurality of APs can be formed.

Figure 3:
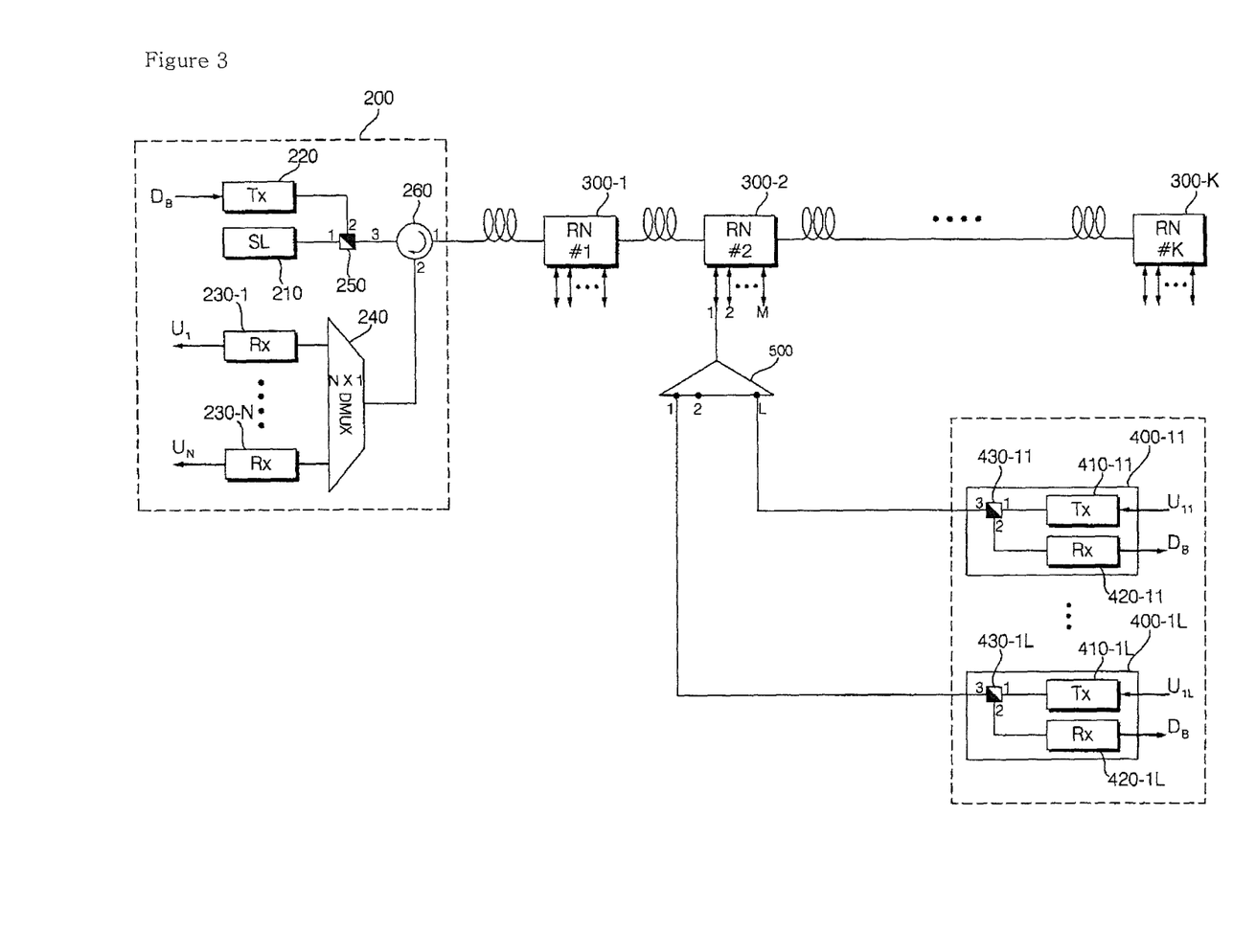
FIG. 3 is a diagram illustrating an optical backhaul network for a wireless broadband service according to another exemplary embodiment of the present invention.

FIG. 3 is a diagram illustrating an optical backhaul network for a wireless broadband service according to another exemplary embodiment of the present invention.

Referring to FIG. 3, an optical backhaul network of FIG. 3 is almost the same as that of FIG. 1. However, the optical backhaul network of FIG. 3 further includes an optical power splitter 500 connected between the RN 300 and the ONU 400.

The light power splitter 500 divides optical power of a downlink optical signal and a seed light signal transmitted from the RN 300 to the ONU 400 and transmits the downlink optical signal and the seed light signal into which optical power is divided to the plurality (L) of ONUs 400.

Further, the optical power splitter 500 collects uplink optical signals coming up from the plurality (L) of ONUs 400, outputs the uplink optical signals to the RN 300, and transmits the uplink optical signals to the OLT 200. In this case, the uplink optical signal may be received in a wavelength division multiplexing packet.

Here, the Tx 410 of the ONU 400 has a function of a burst mode transmitter that can transmit a time division packet. Further, the Rx 230 of the OLT 200 has a function of a burst mode receiver that can receive a time division multiple packet.

In this way, by transferring the downlink optical signal, the seed light signal, and the uplink optical signal through an optical power splitter, a configuration of an optical backhaul network for a wireless broadband service for efficiently connecting one center and a plurality of APs can be formed.

Figure 4:
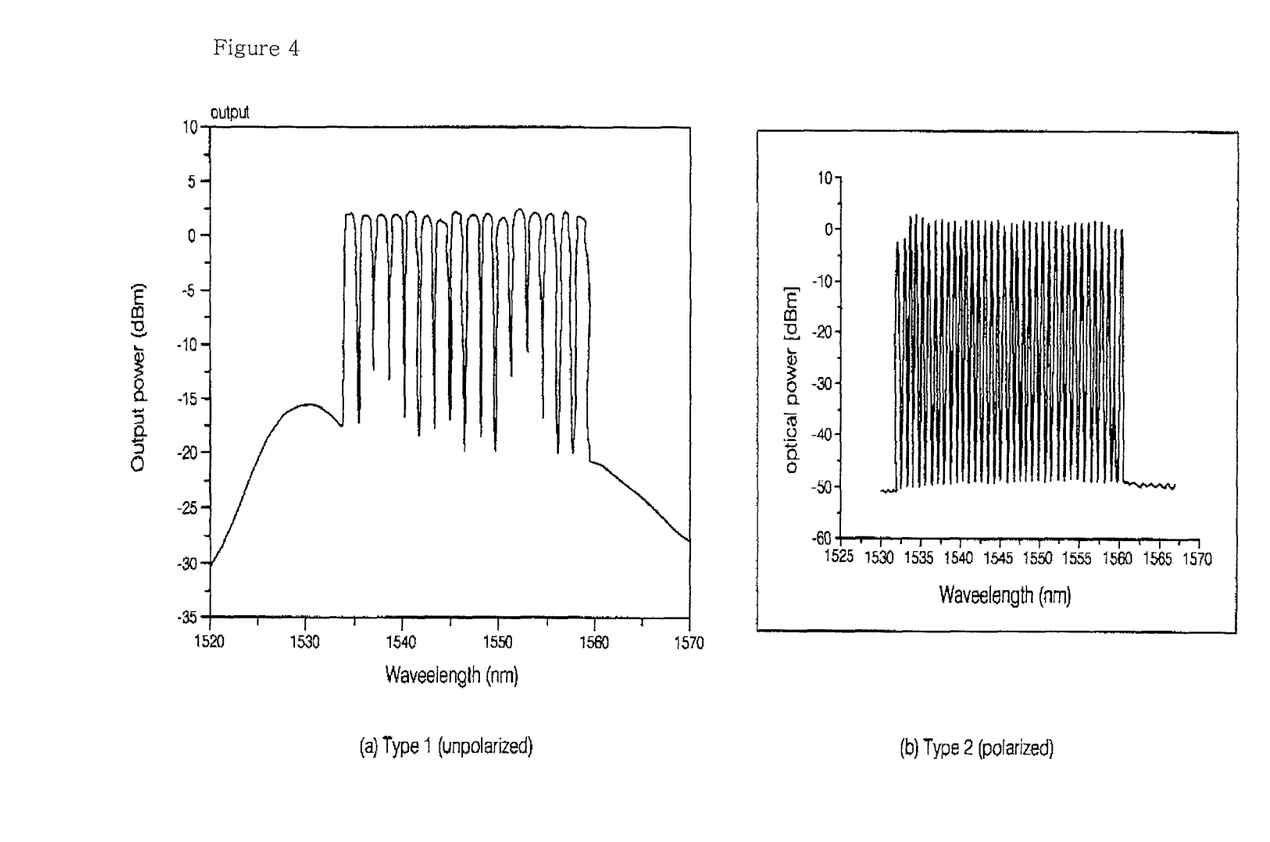
FIG. 4 is a diagram illustrating a spectrum of output light of a seed light module of FIGS. 1 to 3.

FIG. 4 shows a spectrum of output light of the seed light module of FIGS. 1 to 3.

Referring to FIG. 4, when polarization does not exist, as shown in FIG. 4(*a*), in output light output from the seed light module, wavelengths having a wide spectral width may have a multiplexed wavelength form.

Next, when polarization exist, as shown in FIG. 4(*b*), in output light output from the seed light module, wavelengths having a narrow spectral width may have a multiplexed wavelength form.

Figure 5:
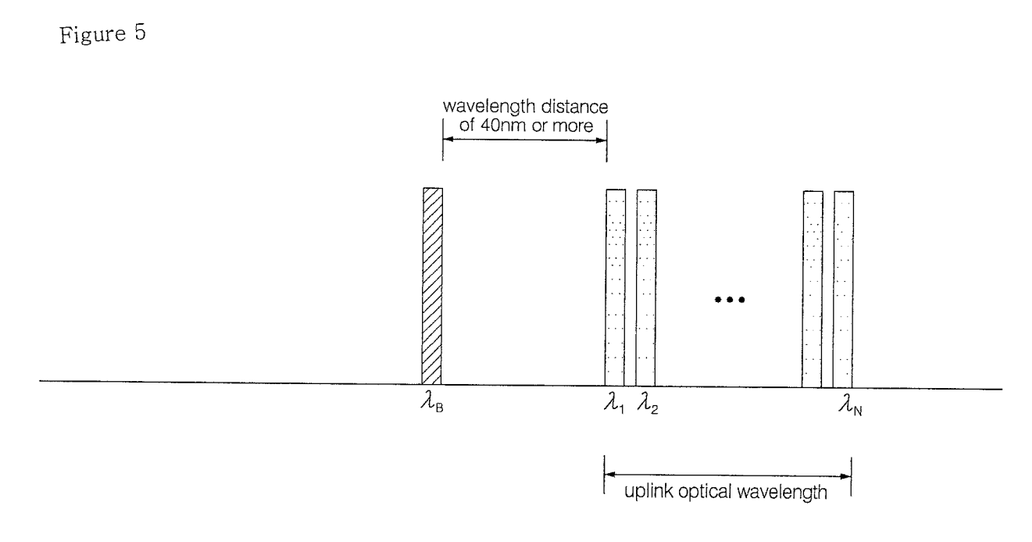
FIG. 5 is a diagram illustrating an example of using a wavelength of a wireless broadband optical backhaul network based on a single mode light source.

FIG. 5 shows an example of using a wavelength of a wireless broadband optical backhaul network based on a light source of a single mode.

Referring to FIG. 5, a downlink optical signal has a single wavelength, and an uplink optical signal has a multiplexed wavelength. It is preferable that the downlink optical wavelength and the uplink optical wavelength use different independent optical wavelengths, and a distance thereof is fully apart by 40 nm or more.

A wavelength of the downlink seed light signal and a wavelength of the uplink optical signal may be the same.

Figure 6:
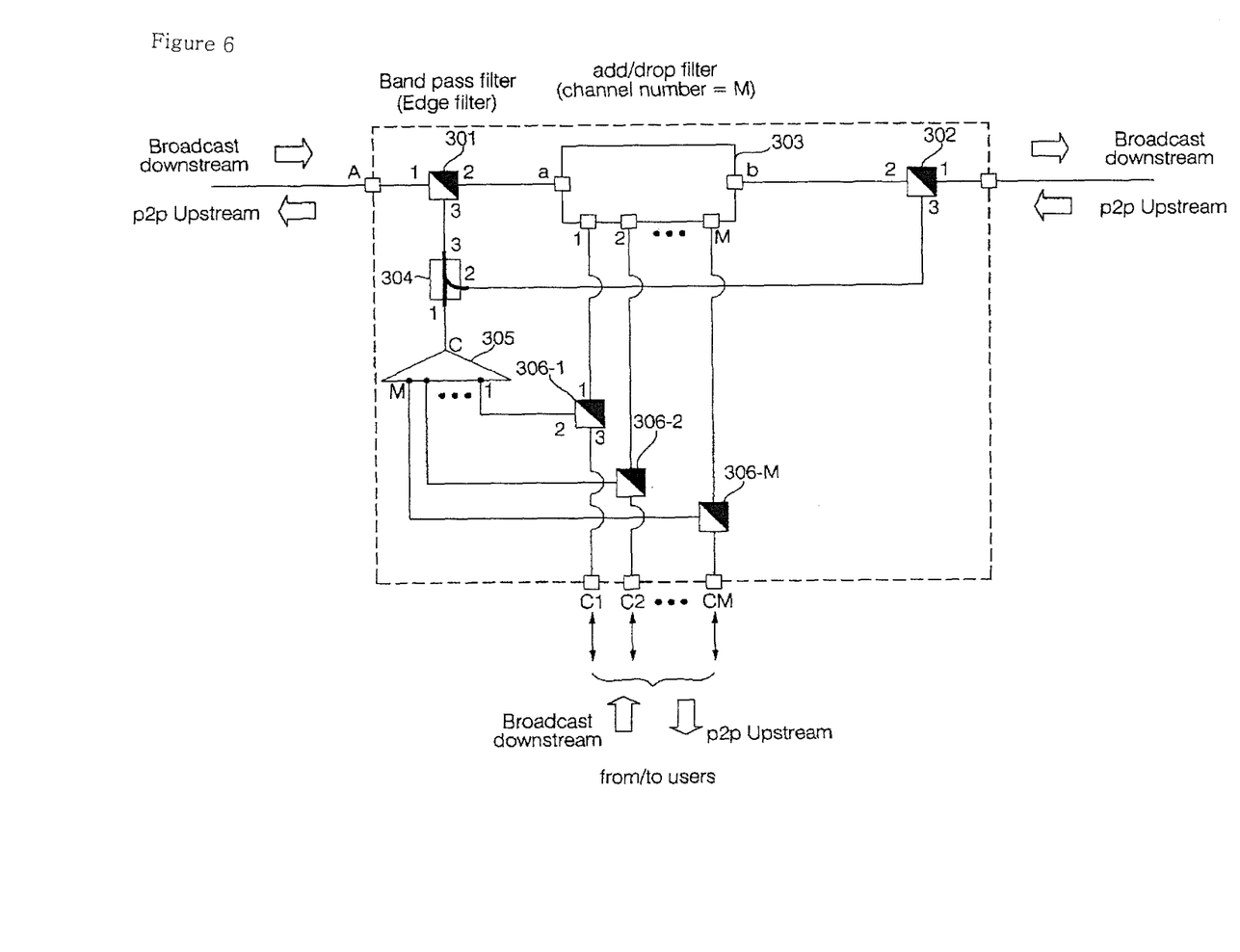
FIG. 6 is a diagram illustrating an example of a remote node of FIG. 1.

FIG. 6 is a diagram illustrating an example of the RN of FIG. 1.

Referring to FIG. 6, the ONU 400 and the RN of FIG. 6 are connected by one optical fiber.

The RN of FIG. 6 includes a plurality of band pass filters 301, 302, and 306-1 to 306-M, one ADD-DROP filter 303, and one optical power splitter 305.

An operation of the RN is described hereinafter.

Downlink seed light coming down from the OLT 200 is input through a port A of the RN, is output to a port 2 via a port 1 of the optical filter 301, and is input to a port a of the ADD-DROP filter 303. Downlink seed light input to the ADD-DROP filter 303 is divided into a plurality (M) of optical wavelengths specified to the ONUs 400 connected to the corresponding RN, and the optical wavelengths are output through each of ports 1 to M. The remaining wavelengths are output through a port b in a multiplexed wavelength state, are output to a port 1 via a port 2 of the optical filter 302, and are transmitted to a next RN through a port B of the RN.

Next, an uplink optical signal having a multiplexed wavelength coming up from the RNs is input to the port B of the RN, is output to the port 2 via the port 1 of the optical filter 302, and is input to a port b of the ADD-DROP filter 303 of a wavelength division multiplexing method. An uplink optical signal input to the ADD-DROP filter 303 is output to a port A in a multiplexed wavelength state, is output to a port 1 via a port 2 of the optical filter 301, and is transmitted to the OLT 200 through the port A of the RN.

Next, a downlink optical signal of a single mode is input to the port A of the RN, is output to the port 3 via the port 1 of the optical filter 301, and a part thereof is output to a port 1 via a port 3 of an optical tap 304 and another part thereof is output to a port 2. A downlink optical signal output via the port 2 of the optical tap 304 is output to a port 1 via a port 3 of the optical filter 302, and is output to the port B of the RN, and is transmitted to a next RN. The downlink optical signal output via the port 1 of the optical tap 304 is input to a port c of the optical power splitter 305, and optical power thereof is divided into M optical signals and is output to 1 to M ports, and each of the divided and output downlink optical signals is output to a port 3 via a port 2 of the optical filter 306, and each of the same downlink optical signals is output via ports C1 to CM. Such a downlink optical signal is transferred in a broadcasting form.

Next, an uplink optical signal coming up from the ONU 400 is input to ports C1 to CM, is output to a port 1 via a port 3 of the optical filter 306, is input to ports 1 to M of the ADD-DROP filter 303, thereby multiplexing a wavelength thereof. An uplink optical signal having a multiplexed wavelength is output to a port a of the ADD-DROP filter 303, is output to a port 1 via a port 2 of the optical filter 301, and is transferred to the OLT 200 through a port A. An uplink optical signal coming up from the RNs and the ONU 400 is an uplink optical signal consisting of each specified optical wavelength and has a multiplexed wavelength.

Because each of ports 1 to M of the RN uses one optical fiber, an optical filter 306 connected between the ADD-DROP filter 303 and the optical power splitter 305 classifies and divides an uplink optical signal and a downlink optical signal on a band width basis.

Figure 7:
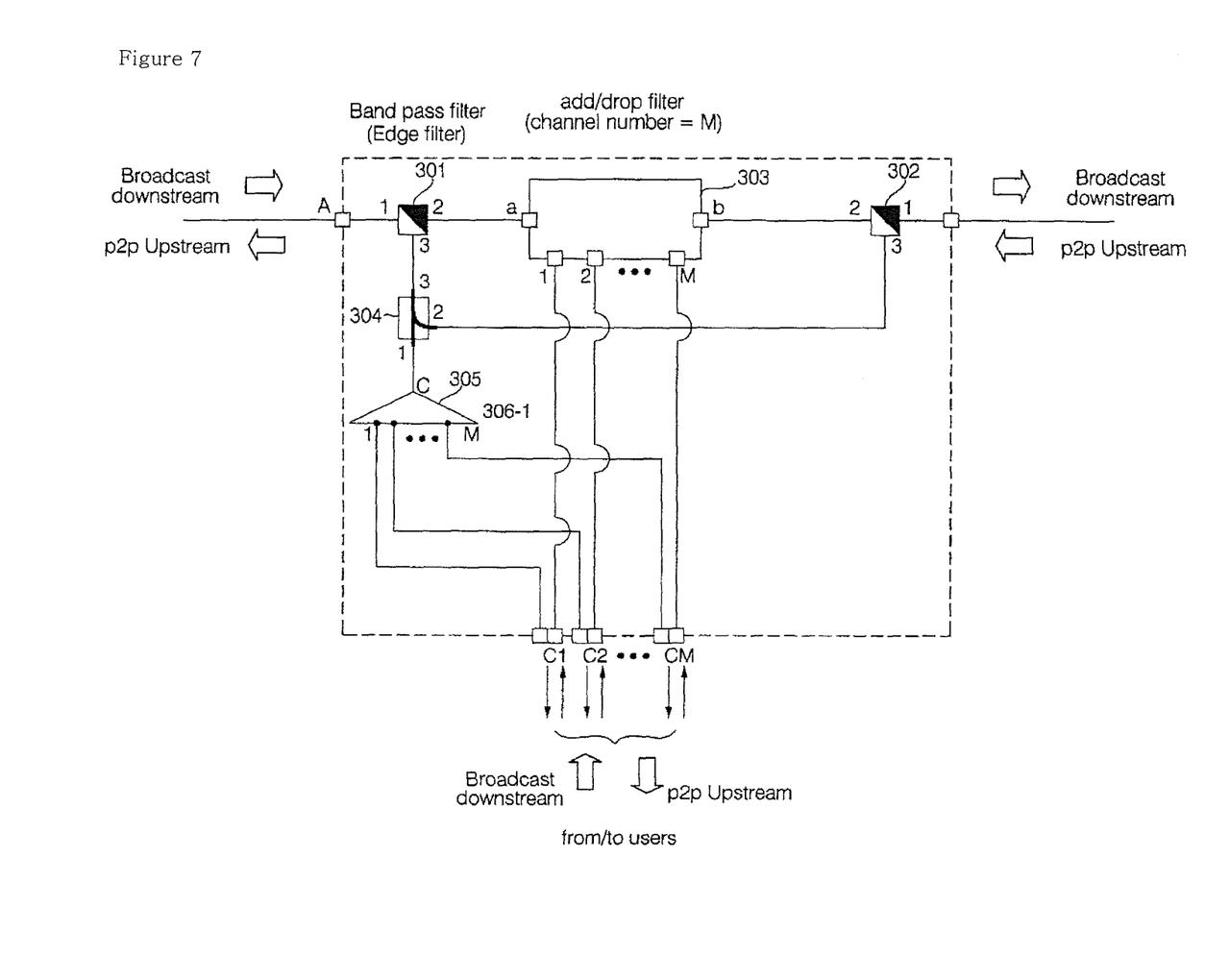
FIG. 7 is a diagram illustrating an example of a remote node of FIG. 2.

FIG. 7 is a diagram illustrating an example of the RN of FIG. 2.

Referring to FIG. 7, two divided optical fibers are connected to the ONU 400 and an RN of FIG. 7.

The RN of FIG. 7 includes two band pass filters 301 and 302, one ADD-DROP filter 303, and one optical power splitter 305.

An operation of the RN of FIG. 7 is described hereinafter.

Downlink seed light coming down from the OLT 200 is input through a port A of the RN, is output to a port 2 via a port 1 of the optical filter 301, and is input to a port a of the ADD-DROP filter 303. Downlink seed light input to the ADD-DROP filter 303 is divided into a plurality (M) of optical wavelengths specified to the ONUs 400 connected to the corresponding RN, and the optical wavelengths are output through each of ports 1 to M. The remaining wavelengths are output through a port b in a multiplexed wavelength state, are output to a port 1 via a port 2 of the optical filter 302, and are transmitted to a next RN through the port B of the RN.

Next, an uplink optical signal having a multiplexed wavelength coming up from the RN is input to a port B of the RN, is output to the port 2 via the port 1 of the optical filter 302, and is input to a port b of the ADD-DROP filter 303 of a wavelength division multiplexing method. An uplink optical signal input to the ADD-DROP filter 303 is output to the port a in a multiplexed wavelength state, is output to the port 1 via the port 2 of the optical filter 301, and is transmitted to the OLT 200 through a port A of the RN.

Next, a downlink optical signal of a single mode is input to the port A of the RN, is output to a port 3 via the port 1 of the optical filter 301, and a part thereof is output to a port 1 via a port 3 of an optical tap 304 and another part thereof is output to a port 2 thereof. A downlink optical signal that is output via the port 2 of the optical tap 304 is output to the port 1 via a port 3 of the optical filter 302, is output to the port B of the RN, and is transmitted to a next RN. The downlink optical signal that is output via the port 1 of the optical tap 304 is input to a port c of the optical power splitter 305, and optical power thereof is divided into M optical signals and is output to ports 1 to M, and each of the divided and output downlink optical signals is output as each of identical downlink optical signals via ports C1 to CM. Such a downlink optical signal is transferred in a broadcasting form.

Next, an uplink optical signal coming up from the ONU 400 is input to ports C1 to CM, is input to the ports 1 to M of the ADD-DROP filter 303, thereby multiplexing a wavelength. An uplink optical signal having a multiplexed wavelength is output to a port a of the ADD-DROP filter 303, is output to the port 1 via the port 2 of the optical filter 301, and is transferred to the OLT 200 through the port A thereof. The uplink optical signal coming up from the RNs and the ONU 400 is an uplink optical signal consisting of each specified optical wavelength and has a multiplexed wavelength.

Because each of ports 1 to M of the RN uses two optical fibers, in order to divide an uplink optical signal and a downlink optical signal, the optical filter 306 of FIG. 6 may not be used.

The embodiment of the invention being thus described, it will be obvious that the same may be varied in many ways. Such variations are not to be regarded as a departure from the sprit and scope of the invention, all such modifications as would be obvious to one skill in the art are intended to be included within the scope of the following claims.

INDUSTRIAL APPLICABILITY

An optical backhaul network for a wireless broadband service according to the present invention is used for transmitting a downlink optical signal in a broadcasting form.

The invention claimed is:

1. An optical backhaul network for a wireless broadband service, comprising:
a plurality of optical network units (ONUs) outputting an uplink optical signal having a multiplexed wavelength;
an optical line termination (OLT) outputting a downlink optical signal of a single mode in order to transmit the downlink optical signal to the ONUs in a broadcasting form; and
a plurality of remote nodes (RNs) outputting a part of the downlink optical signal to the ONUs and for outputting the uplink optical signal to the OLT,
wherein the OLT comprises:
a seed optical module outputting a seed optical signal having a multiplexed wavelength;
an optical transmitter transmitting the downlink optical signal of the single mode;
an optical wavelength demultiplexer separating wavelengths of the uplink optical signal having different wavelengths;
an optical receiver receiving the uplink optical signal having a separated wavelength;
an optical filter coupling the seed optical signal and the downlink optical signal; and
an optical circulator transferring the coupled seed optical signal and downlink optical signal to the RN and transferring the uplink optical signal to the optical wavelength demultiplexer.

2. The optical backhaul network of claim 1, wherein the downlink optical signal of a single mode and the plurality of uplink optical signals use different independent optical wavelengths.

3. The optical backhaul network of claim 1, wherein the OLT further outputs a seed light signal having a multiplexed optical wavelength, and
the uplink optical signal is generated using the seed light signal.

4. The optical backhaul network of claim 3, wherein the RN divides wavelengths of the downlink optical signal, transmits a part thereof to the RN after sequentially connecting, and transmits another part to the ONUs connected to the corresponding RN,
the RN divides wavelengths of the seed light signal and transmits a specified seed light signal to the ONUs connected to the corresponding RN, and
the RN multiplexes a wavelength of the uplink optical signal and transmits the uplink optical signal to the OLT.

5. The optical backhaul network of claim 3, wherein the RN and the ONU are connected through one optical fiber, and
the uplink optical signal, the seed light signal, and the downlink optical signal are transferred through the optical fiber.

6. The optical backhaul network of claim 5, wherein the ONU comprises:
an optical receiver for receiving the downlink optical signal of the single mode and restoring downlink information;
an optical transmitter for transmitting the uplink optical signal generated using the seed light signal; and
an optical filter for transferring the downlink optical signal to the optical receiver and transferring the uplink optical signal to the RN.

7. The optical backhaul network of claim 6, wherein the optical transmitter comprises a reflective semiconductor optical amplifier.

8. An optical backhaul network for a wireless broadband service, comprising:
a plurality of optical network units (ONUs) outputting an uplink optical signal having a multiplexed wavelength;
an optical line termination (OLT) for outputting a downlink optical signal of a single mode in order to transmit the downlink optical signal to the ONUs in a broadcasting form; and
a plurality of remote nodes (RNs) for outputting a part of the downlink optical signal to the ONUs and for outputting the uplink optical signal to the OLT,
wherein the downlink optical signal of a single mode and the plurality of uplink optical signals use different independent optical wavelengths,
wherein the OLT further outputs a seed light signal having a multiplexed optical wavelength, and the uplink optical signal is generated using the seed light signal,
wherein the RN and the ONU are connected through one optical fiber, and the uplink optical signal, the seed light signal, and the downlink optical signal are transferred through the optical fiber, and
wherein the RN comprises:
an ADD-DROP filter for dividing optical wavelengths of the input downlink seed light, outputting a part thereof in order to transfer to the ONU, outputting another part thereof in order to transfer to the connected next RN, and multiplexing wavelengths of the uplink optical signal from the next RN and the uplink optical signal from the ONU and outputting the wavelengths in order to transfer to the OLT;
an optical power splitter for separating optical power of the downlink optical signal and outputting the optical power in order to transfer to each of the ONUs; and
an optical filter for being connected between the ADD-DROP filter and the optical power splitter to transfer the uplink optical signal and the downlink optical signal.

9. The optical backhaul network of claim 8, wherein the downlink optical signal from the optical power splitter provided in the RN is transferred to the ONUs in a broadcasting form, and
the ONUs output the uplink optical signal consisting of each specified optical wavelength.

10. The optical backhaul network of claim 3, wherein the RN and the ONU are connected through two optical fibers, and the uplink optical signal, the seed light, and the uplink optical signal are transferred through different optical fibers.

11. The optical backhaul network of claim 10, wherein the ONU comprises:
an optical receiver for receiving the downlink optical signal of the single mode and restoring downlink information; and
an optical transmitter for transmitting the generated uplink optical signal using the seed light signal.

12. The optical backhaul network of claim 11, wherein the optical transmitter comprises a reflective semiconductor optical amplifier.

13. An optical backhaul network for a wireless broadband service, comprising:
a plurality of optical network units (ONUs) outputting an uplink optical signal having a multiplexed wavelength;
an optical line termination (OLT) for outputting a downlink optical signal of a single mode in order to transmit the downlink optical signal to the ONUs in a broadcasting form; and
a plurality of remote nodes (RNs) for outputting a part of the downlink optical signal to the ONUs and for outputting the uplink optical signal to the OLT,
wherein the downlink optical signal of a single mode and the plurality of uplink optical signals use different independent optical wavelengths,
wherein the OLT further outputs a seed light signal having a multiplexed optical wavelength, and the uplink optical signal is generated using the seed light signal,
wherein the RN and the ONU are connected through two optical fibers, and the uplink optical signal, the seed light, and the uplink optical signal are transferred through different optical fibers, and
wherein the RN comprises:
a ADD-DROP filter for separating an optical wavelength of the input downlink seed light, outputting a part thereof in order to transfer to the ONU, outputting another part thereof in order to transfer to the connected next RN, and multiplexing wavelengths of the uplink optical signal from the next RN and the uplink optical signal from the ONU and outputting the wavelengths in order to transfer to the OLT; and
an optical power splitter for separating optical power of the downlink optical signal and outputting the optical power in order to transfer to each of the ONUs.

14. The optical backhaul network of claim 13, wherein the downlink optical signal from the optical power splitter provided in the RN is transferred to the ONUs in a broadcasting form, and
the ONUs output the uplink optical signal consisting of each specified optical wavelength.

15. The optical backhaul network of claim 3, further comprising an optical power splitter for being connected between the RN and the ONU to separate and transfer optical power of the downlink optical signal from the RN.

16. The optical backhaul network of claim 15, wherein the ONU receives an optical broadcasting signal, and
the OLT receives a wavelength division multiple packet as the uplink optical signal.

17. The optical backhaul network of claim 1, wherein the OLT comprises:
a seed optical module for outputting a seed optical signal having a multiplexed wavelength;
an optical transmitter for transmitting the downlink optical signal of the single mode;
an optical wavelength demultiplexer for separating wavelengths of the uplink optical signal having different wavelengths;
an optical receiver for receiving the uplink optical signal having a separated wavelength;
an optical filter for coupling the seed optical signal and the downlink optical signal; and
an optical circulator for transferring the coupled seed optical signal and downlink optical signal to the RN and for transferring the uplink optical signal to the optical wavelength demultiplexer.

* * * * *